United States Patent [19]

Walters

[11] 3,975,480

[45] Aug. 17, 1976

[54] METHOD OF MAKING ORNAMENTAL PLASTIC ARTICLES

[76] Inventor: Ben Walters, 4600 11th Ave., Hialeah, Fla. 33013

[22] Filed: Oct. 24, 1974

[21] Appl. No.: 517,468

[52] U.S. Cl. .............................. 264/113; 264/126; 264/245

[51] Int. Cl.$^2$ .............................. B29C 9/00

[58] Field of Search .............................. 264/113, 126, 245

[56] References Cited

UNITED STATES PATENTS

| | | | |
|---|---|---|---|
| 2,749,640 | 6/1956 | Scott | 264/245 |
| 2,761,177 | 9/1956 | Walters | 264/126 |
| 3,414,642 | 12/1968 | Baum | 264/126 |
| 3,461,016 | 8/1969 | Irving, Jr. et al. | 264/126 |
| 3,791,899 | 2/1974 | Walters | 264/126 |

*Primary Examiner*—Robert F. White
*Assistant Examiner*—T. E. Balhoff
*Attorney, Agent, or Firm*—Howard C. Miskin

[57] ABSTRACT

An ornamental plastic article having a smooth rear exterior surface and a rough, randomly arranged layer of plastic particles or pellets forming the front outer surface is produced by placing a layer of plastic powder on one surface of a first mold form containing an outer wall having the configuration of the article, heating the powder until the powder becomes tacky in the form of a strip, placing this form on top of a mating second mold form having an outer wall containing various pockets of different colored plastic pellets of a compatible plastic material located in predetermined locations within the outer wall, rotating the two forms until the tacky powder form is on the bottom and the pockets of colored plastic pellets are on top, reversing the position of the two forms, and removing the first form which has a layer of plastic pellets affixed to the tacky layer in predetermined color arrangement corresponding to the pocket location on the second mold form, heating the pellets until they become soft, and then placing a heated third mold form containing the desired design in a wall configuration onto the heated sheet to add the design and color to the plastic pellets and then cooling the sheet, so that the pellets adhere to each other and to the plastic backing strip for forming the design and then removing the article from the first form.

6 Claims, 11 Drawing Figures

METHOD OF MAKING ORNAMENTAL PLASTIC ARTICLES

BACKGROUND OF THE INVENTION

This invention relates to a method of making an ornamental plastic article and more particularly a method of making an ornamental flat plastic article that is smooth on one surface and rough on the opposite surface which contains the design of the article in different colored plastic pellets or beads.

In the prior art, especially two of my earlier patents such as U.S. Pat. No. 2,761,177 issued Sept. 4, 1956 and U.S. Pat. No. 3,523,031 issued Aug. 4, 1970, methods were described in which plastic sheets were formed having varied colored plastic material fused together to form a sheet. Other methods fused toghether varied colored particles or pellets of plastic material leveled to form a vari-colored plastic sheet. With these prior art methods, while producing varied colored sheets and articles, it was ordinarily impossible to repetitively duplicate the coloring effect and often times only close approximation of desired colored effect were obtained. In my '031 U.S. Pat. No. 3,523,031, I disclosed a method for obtaining a reproducible design by using a sheet containing an underlying design and then placing a layer of plastic material over the sheet and then the plastic pellets were affixed to the powder by heat. This method produced a reproducible design in an easy simpe manner, but it was very difficult to produce articles having a distinctive outer configuration, and interior design such as animals, snownman, wall plaques and the like. Making ornamental plastic sheets and articles by the prior art methods was considered an art with respect to obtaining the desired coloring or ornamental effect, since it depended to a great deal on the skill of the individual worker in applying different colored pellets to different areas on the article or plastic sheet. While these plastic sheets and articles made from prior art methods were satisfactory from a technical standpoint, oftentimes they were not especially realistic in appearance since they depended upon the worker's skill in distributing the colored plastic granular pellets. It was difficult, if not impossible, to repetitively produce multiple colored designs in the plastic sheets, such as animals, flowers, figures, scenes or art works.

SUMMARY OF THE INVENTION

The present inventin discloses a method by which an ornamental plastic article or a sheet is obtained containing a design which can be duplicated, as many times as desired.

Accordingly it is an object of the present invention to produce an ornamental article containing a design which can be repeated any number of times as desired.

Another object of the present invention is to provide a method for making an ornamental plastic article having a smooth bottom surface and granular, randomly located particles of plastic forming a design on the outer upper surface.

Another object of the present invention is to provide a process for making a plastic article of predetermined, reproducible configuration and form and design which is relatively inexpensive.

Still another object of the present invention is to provide a method that produces a highly ornamental plastic article of reproducible form that accomplishes all of the above which utilizes inexpensive and unskilled labor and low cost materials, molds and apparatus.

Other objects and features of the present invention will become apparent when the following description is considered in connection with the annexed drawings in which.

Figure 1:
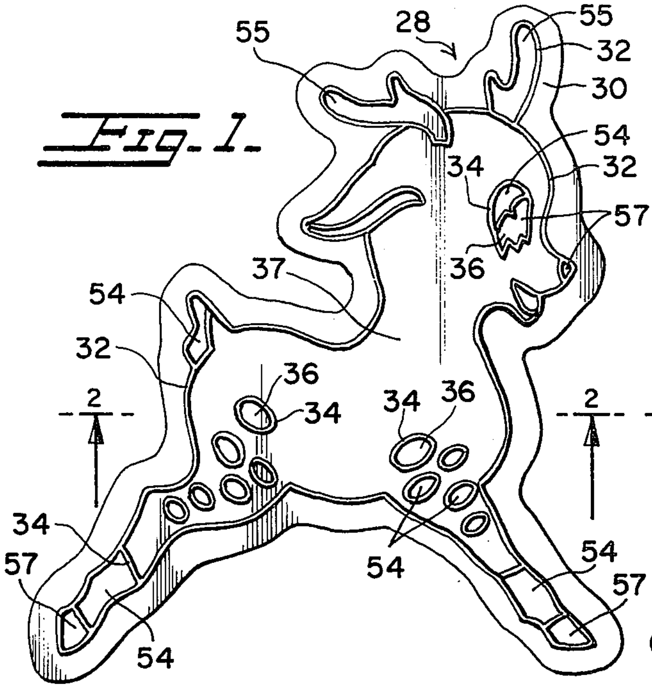
FIG. 1 is a top plan view of one molded form in accordance with the present invention.

The above and other objections of the present invention will become apparent from the reading of the following description taken in conjunction with the accompanying drawing which illustrates preferred embodiments thereof.

In a sense the present invention contemplates a method for producing a plurality of the same ornamental plastic articles having an outer shape of a desired configuration and a plurality of designs and colors within its edges, comprising having a first mold surface with an outer peripheral wall of the desired configuration of the article to be produced, and having a plurality of inner walls within the outer wall each defining a pocket, the top surfaces of all of the walls lying in a plane, placing plastic pellets of desired colors within selective pockets, wherein the entire first surface is covered with selective colors of plastic pellets, placing a plastic powder on a second mold surface corresponding in configuration to the first surface, heating the plastic powder unitl the powder becomes tacky, placing the second mold surface on top of the first mold surface, so that the tacky powder faces the plastic pellets and abuts the surface of the walls of the first mold surface, rotating the molds so that the tacky surface is lower so that pellets in the pockets contact the tacky surface and adhere thereto, returning the second mold surface to the upper position and removing it with the tacky powder and the adhering pellets heating the pellets on the second mold so that the pellets adhere to each other and to the tacky surface, and either cooling and removing the article from the mold or placing a third mold surface, having generally the same outer configuration with extensions from its surface and the top surfaces of these extensions having desired configurations, coloring the top surfaces in the desired colors and then placing it in contact with the heated pellets on the second and compressing its mold surface so that the colors from the third mold surface are transferred to the plastic and the surface compresses the pellets in contact with it, removing the third mold surface and cooling the second mold surface and then removing the plastic article which has the desired outer configuration and the desired design and colors and repeating the above steps to reproduce the same article.

In a preferred form of the process the second mold has a peripheral wall which contacts and mates with the outer wall of the first mold surface for properly positioning the second mold surface onto the first mold surface and preventing any loss of any pellets.

There is also disclosed a mold for making ornamental plastic articles having a first form having a outer wall of the desired configuration and interior walls defining pockets for desired design on the article, all walls being generally perpendicular to the first mold surface and having their upper edges being coplanar. The pockets receive selected different colored plastic pellets which make up the design. A second mold form has a surface facing the first mold surface which rests on the upper edges of its walls, and is adapted to have a tacky powder mixture thereon, so that when the facing mold surfaces are rotated and the second mold surface is on the bottom, pellets from the first mold form of the desired colors and in the desired location adhere to the takcy layer, so that the second mold surface can be removed and placed in an oven and heated for producing the desired plastic article.

DESCRIPTION OF THE PREFERRED EMBODIMENTS

Similar reference characters refer to similar elements throughout the several views of the drawings.

Figure 7:
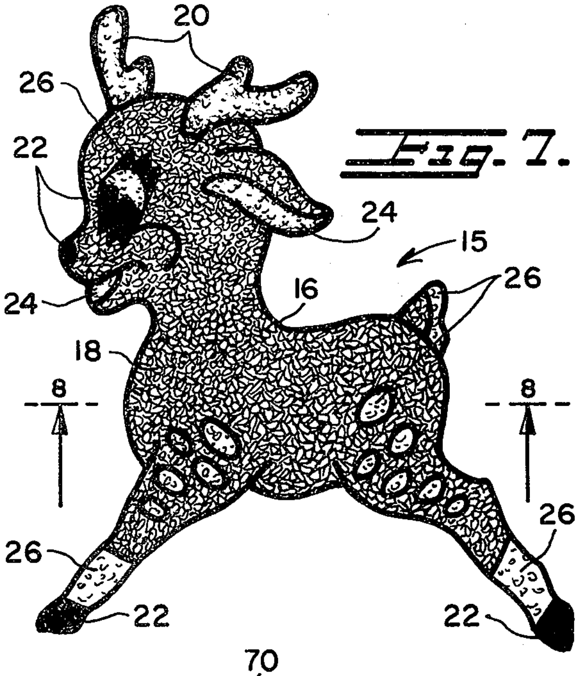
FIG. 7 is a finished article made in accordance with the present invention.
Figure 8:
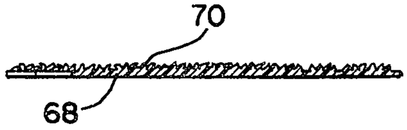
FIG. 8 is a cross sectional view taken along line 8—8 of FIG. 7.
Figure 9:
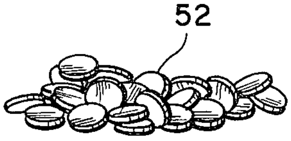
FIG. 9 is an enlarged view of plastic pellets prior to heating.
Figure 10:
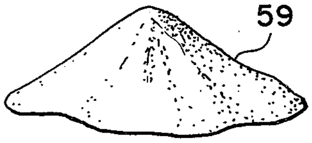
FIG. 10 is a mound of plastic powder.

FIGS. 7–8 show a plastic ornamental article 15 produced in accordance with the present invention, which is illustratively shown as a baby deer. The deer shown in FIG. 7 has an outer configuration of the desired shape illustrated at 16 and has its upper outer surface roughened and made of pellets 52, such as illustrated in FIG. 9, which is shown as discs pellets 52 come in a variety of different colors, such as brown, illustrated at 18, yellow at 20, black at 22, pink at 24 and pathces of white are illustrated at 26.

Figure 11:
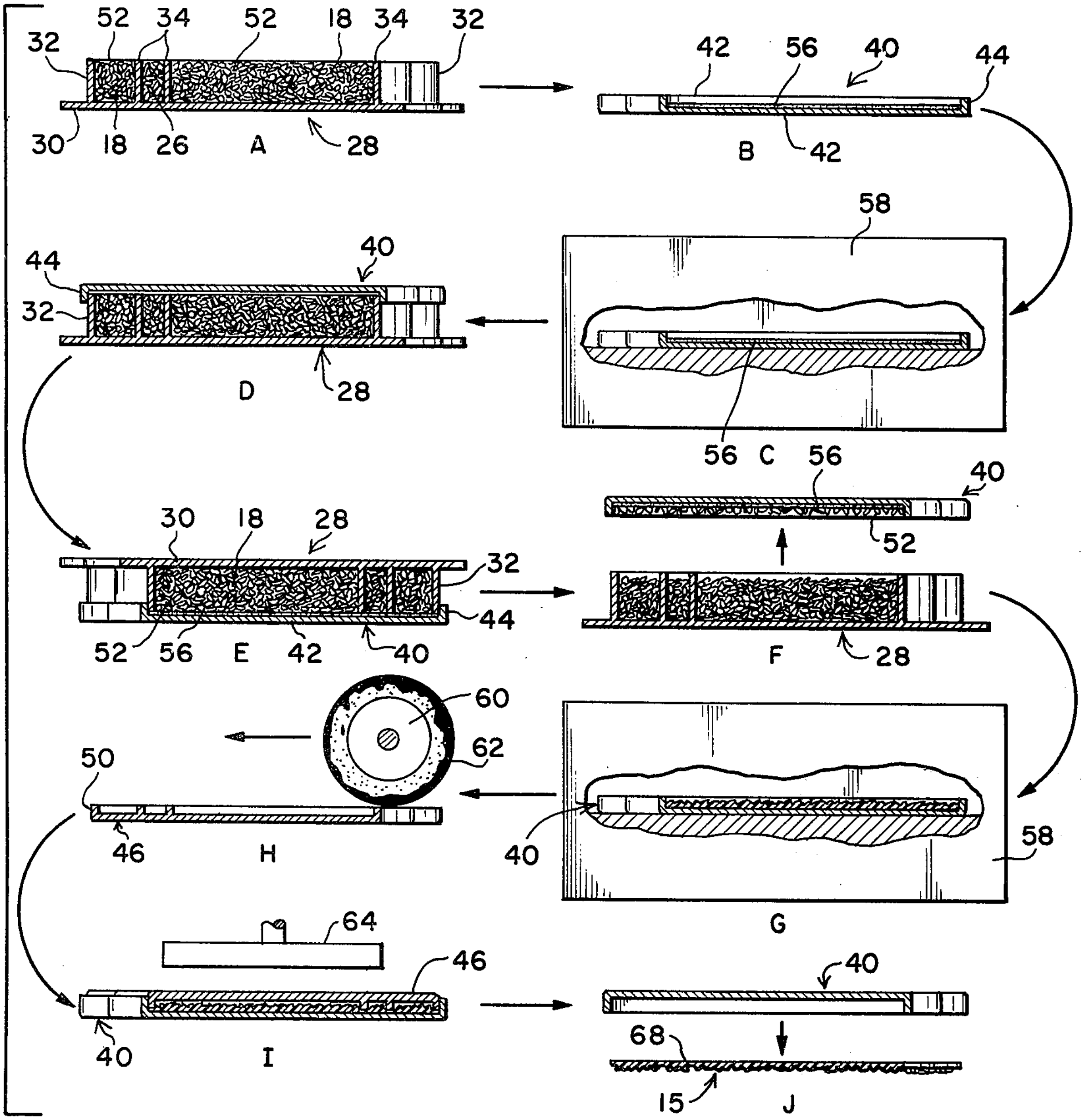
FIG. 11 is a schematic elevational sectional view illustrating the series of steps of the methods for producing an ornamental plastic article in accordance with the present invention.

Article 15 is made by the molds illustrated in FIGS. 1–6 and made in accordance with the steps illustrated in FIG. 11. FIG. 1 illustrates a first mold form 28, which is mounted on a base 30. Extending generally perpenidcular to base 30 is an outer wall 32 having the desired configuration, which, as illustrated in the drawing, is in the form of a baby deer. Disposed within wall 32 are a plurality of walls 34, which define pockets 36. A larger pocket 37 is formed in the space defined by outer wall 32 and inner walls 34. Walls 32 and 34 extend from base 30 in a uniform height, so that the top edges 38 lie in a plane. Advantageously walls 32 and 34 are made of aluminum.

Figure 3:
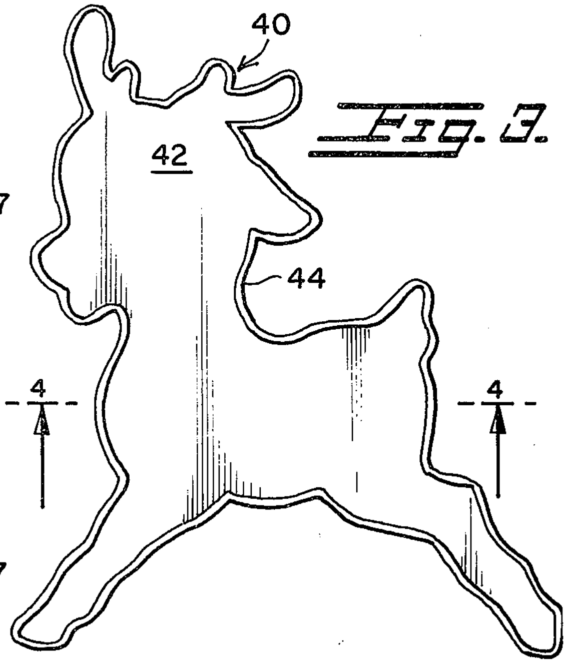
FIG. 3 is a top plan view of a corresponding mating second mold form in accordance with the present invention.
Figure 2:
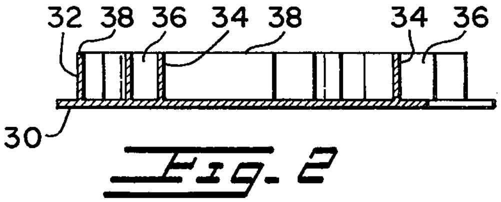
FIG. 2 is a cross sectional view along line 2—2 of FIG. 1.
Figure 4:
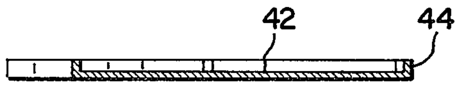
FIG. 4 is a cross sectional view along line 4—4 of FIG. 3.

In FIG. 3 is illustrated a second mold form 40 having a surface 42 surrounded by an outer wall 44 of the same general configuration as that of wall 32 in mold 28. Advantageously wall 44 fits around wall 32, so at to properly position mold 40 with respect to mold 28 in the manner as discussed hereafter and to prevent loss of plastic pellets 52 as will be discussed hereafter.

Figure 5:
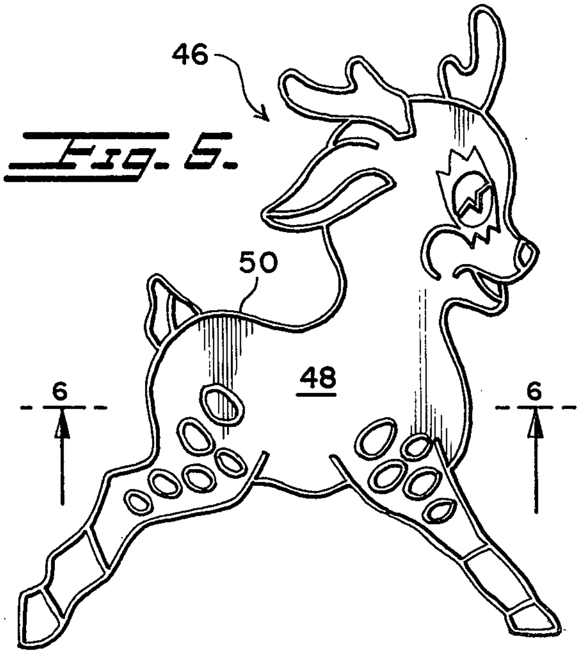
FIG. 5 is a top plan view of the corresponding third mold form in accordance with the present invention.
Figure 6:
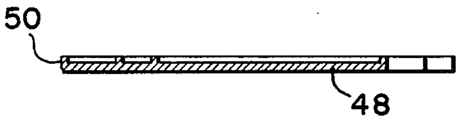
FIG. 6 is a cross sectional view taken along line 6—6 of FIG. 5.

A third mold form 46 is illustrated in FIGS. 5–6 which has a base 48 with a wall 50 extending perpendicular from surface 48 greater than the thickness of one layer of pellets. Walls 50 correspond to selective one of walls 34 of mold 28.

FIG. 11 illustrate a method in accordance with the present invention to make the desired ornamental article. Plastic pellets 52, such as illustrated in FIG. 9, are placed selectively in accordance with the color sequence defined on mold surface 30 within the pockets 36. As illustrated, for the design shown in FIG. 7, pellets 52 in the color of brown are positioned in the pocket 37, corresponding to the brown portion 18 of the article of FIG. 7, the yellow pellets 52 are positioned within pockets 55 which correspond to portion 20 of article 15, black pellets are positioned within pockets 57 and to correspond with portions identified by numeral 22 in FIG. 7, white pellets are placed within pockets 54 and so on. As illustrated in FIG. 11A the pockets 36 taken along line 2—2 of mold 28 are filled with plastic pellets 52, which are brown indicated at 18 and white indicated at 26.

As shown in FIG. 11B, second mold form 40 has a powdered plastic material 59 disposed on its upper surface 42 in an even thin layer 56 covering the surface. As shown in 11C, the mold and surface is heated above the melting point of the plastic, such as in oven 58 so that it becomes tacky. While an oven is shown for heating, other heat sources may be used such as a liquid bath, radiation, heat lamps or the like. Mold 40 is taken from the oven and placed on top of mold 28, as illustrated in FIG. 11D such that wall 44 of mold 40 abuts the outer surface of the corresponding portion of wall 32 of mold 28, so as to encircle mold 28 as shown. The tacky surface 56 abuts the upper edges of walls 32 and 34 of mold 28 and the combination of molds are reversed 180° so that mold 28 is above mold 40, as illustrated in FIG. 11E and the pellets or particles of plastic 52 from the various pockets 36 and 37 of mold 28 abuts tacky layer 56 and are spread evenly over tacky layer 56. The molds are rotated back to their initial position, such as shown in FIG. 11D and separated as shown in FIG. 11F with mold 40 being removed from mold 28 with the layer of pellets adhering to the tacky layer 56 on mold 40. Mold 40 with the layer of pellets is heated in an oven 58, such as illustrated in FIG. 11G and by controlling the heat of oven 58 particles 52 becomes tacky and are bonded at their points of contact to each other to form a sheet of semi-fused particles and which are also welded and fused to the tacky powder layer of 56.

To form a more finished design, the upper surfaces of walls 50 of mold 46, illustrated in FIGS. 5 and 6 are coated with the desired colors, such as illustrated in FIG. 7 by an ink roller 60 coated with the desired coloring material 62. As illustrated in FIG. 11H all of walls 60 are coated with the same color, such as black; however, other colors can be utilized by more selective rolling of the walls 50, which is well known in the art. As shown in FIG. 11I mold 46 is placed on top of mold 40, so that coated walls 50 come into contact with the plastic particles 52, whereby the coloring is transferred to the soft tacky plastic particles 52. Applying pressure to mold form 46 by a press, illustratively shown at 64, the plastic particles beneath walls 50 are further deformed by reason of pressure being applied, the plastic particles 52 are deformed at selective portions by walls 50.

The next step is cooling mold 40 and the exterior of the article 15 is below the softening temperature of the thermoplastic material and the article 15 is removed as shown in FIG. 11J having the desired coloring within the design and the outer configuration. The bottom surface 68 of article 15 is smooth, whereas the upper surface 70 is rough from the nature of particles 52. Mold 40 is then in condition for repeating the steps of FIG. 11.

If desired steps 11H and 11I can be eliminated so that the article will not have the ink markings or depressions provided by those two steps. Instead the article after being heated in oven 58, such as shown in FIG. 11G is then cooled and the article removed from mold 40 as shown in FIG. 11J.

While steps 11B and 11C show first placing a thin layer of plastic powder 59 onto mold surface 42, as illustrated in FIG. 11B and then heated in oven 58 as shown in FIG. 11C, mold 40 can be heated to a temperature above the melting point of the plastic to be used first in any convenient manner such as in an oven 58, or in a high temperature liquid bath, radiation or the like. Then surface 42 can be coated with the uniform thin layer of powder plastic material 59, which then becomes tacky and fuses on the heated mold surface to form a continuous uniform film. Then the steps illustrated in FIGS. 11D through 11J are followed as shown.

The temperature at which the plastic coating material 59 becomes tacky depends on the type of plastic used, the thickness of the coating to be applied and the shape, mass and specific heat of the mold. The plastic coating is heated sufficient to remain tacky for steps 11D and 11E.

While the plastic particle of pellets 2 are shown as thin discs in FIG. 9, they could be produced and used in a variety of shapes and forms, suchas ovals, discs, stars, triangles, cylinders, turnings etc. as well as, as indicated above, in various colors. Preferable the heating of the article in step 11G is only sufficient to provide bonding but the particles or pellets retain some semblance of the original appearance.

While mold form 40 is shown having a planar surface 42, surface 42 could be curved or contoured as desired. Also, different colored designs can be obtained where pellets of one color or shape can be positioned in selected pockets 36 or 37. Such differences can provide variations in design or appearance. Clear or colorless plastic may be used and produces highly effective results.

While plastic materials such as high density polyethylene has been used effectively, other thermoplastic materials can be used such as cellulose acetate, cellulose acetate butyrate, polyvinyl, polypropylene, polybutylene, styrene, acrylic, ABS polymers, ethyl cellulose propionate, chlorinated polyether, polyvinyl chloride, polyvinylidene chloride, copolymers of methyl methacrylate and styrene, copolymers of butadiene and polystyrene, polyamide, and polycarbonate. Pigments or dyes in the material will yield any desired color in the finished product, and the use of differently colored coarse grained particles will engender a multi-colored appearance of the finished article. Further, the particles may be opaque, translucent or transparent, or a mixture thereof, all of which will have an influence upon the esthetic effect on the finished article. Any density of thermoplastic material may be utilized depending on the desired stiffness of the finished product.

The present invention eliminates any waste of plastic material since the powder and pellets are distributed only over the entire surface of the mold and any unadhered materials can be collected and reused.

Additionally, the use of placing an electrostatic charge on the powder prior to disposing it on the outer surface of the mold, avoids initially heating the mold and allows uniform placement of the thin layer of powder and then heating the mold. The powder can be applied and positioned on the mold surface by electrostatic placement or spraying.

While the preferred embodiments have been described above, it is understood that many variations thereof will be readily apparent to those skilled in the art without departing from the spirit thereof. Therefore, it is intended that the foregoing description shall be deemed illustrative only and not construed in a limiting sense, the present invention being defined solely by the appended claims.

What I claim is:

1. A process for producing an ornamental plastic article having a predetermined outer configuration comprising:

a. providing a first mold surface having an outer wall of said predetermined configuration generally perpendicular to said surface;
b. providing at least one second wall extending from the first mold surface within said outer wall to define a corresponding pocket for plastic particles;
c. forming the upper edge of said second wall to a predetermined shape;
d. providing plastic particles on said mold surface and within said outer wall of one color;
e. providing plastic particles of a color different from said first color on said mold surface and within said pocket;
f. depositing on a second mold surfae, a thin layer of thermo-plastic composition in a finally divided state;
g. heating said layer on said second mold surface to cause the layer to fuse and become tacky;
h. superposing said second mold surface in position with respect to said first mold surface with the tacky layer facing the sources of particles on said first mold surface;
i. positioning said first and second mold surfaces so that said second mold surface is below said first mold surface to cause said sources of plastic particles to contact the tacky surface at pre-selected areas;
j. removing said second mold surface from said first mold surface;
k. heating said particles on the tacky layer to cause them to become soft without complete coalescence thereof to form a layer of said particles upon said first layer and be bonded thereto;
l. cooling said particle layer and said first layer to form a coherent surface covering said second mold surface; and
m. removing said coherent surface covering from second mold surface, whereby an article of the desired configuration having various designs therein is formed.

2. The process in accordance with claim 1 and further including after step (h) the step of coating a marking material on a third mold surface of predetermined design corresponding to the plastic layer on the second mold surface, superimposing the third mold surface onto the plastic particle layer in a predetermined position to transfer the marking material on predetermined areas of the plastic particle layer.

3. The process in accordance with claim 2 wherein the transfer step includes compressing the third mold surface against the plastic particle layer.

4. The process in accordance with claim 1 wherein the sources of plastic particles are of different colors which correspond to the design of the article.

5. The process in accordance with claim 1 wherein step (f) entails rotating the mold surfaces.

6. The process in accordance with claim 2 wherein the coating step entails rolling an inked roller on selected portions of the third mold surface.

* * * * *